United States Patent
Vaddi

(10) Patent No.: US 6,214,257 B1
(45) Date of Patent: Apr. 10, 2001

(54) ELECTROLUMINESCENT PHOSPHOR WITH HIGH BRIGHTNESS

(75) Inventor: Butchi Reddy Vaddi, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/327,029

(22) Filed: Jun. 7, 1999

(51) Int. Cl.⁷ ............................ C09K 11/54; C09K 11/56
(52) U.S. Cl. ...................................................... 252/301.6 S
(58) Field of Search ..................... 252/301.4 R, 301.6 S

(56) References Cited

U.S. PATENT DOCUMENTS 4,859,361 * 8/1989 Reilly et al. ................... 252/301.6 S
4,888,129 * 12/1989 Yale ............................... 252/301.6 S
5,110,499 * 5/1992 Reilly et al. ................... 252/301.6 S

* cited by examiner

Primary Examiner—C. Melissa Koslow
(74) Attorney, Agent, or Firm—William H. McNeill

(57) ABSTRACT

A method of increasing the brightness of an electroluminescent phosphor comprises the steps of forming the phosphor as a base phosphor to have a given brightness; and annealing the base phosphor at a temperature and for a time sufficient to increase the given brightness of the base phosphor and form an annealed phosphor. Brightness can be increased from 8% to about 33% when measure against a control made by the same process but not annealed.

5 Claims, No Drawings

ELECTROLUMINESCENT PHOSPHOR WITH HIGH BRIGHTNESS

TECHNICAL FIELD

This invention relates to electroluminescent phosphors and more particularly to methods of increasing the brightness of such phosphors.

BACKGROUND ART

Electroluminescent phosphors are materials that emit light when energized by an electric field. Such phosphors find use as night lights, watch faces, backlighting for LCD computer screens, copy machines, automotive dashboards, control switch illumination, etc. U.S. Pat. Nos. 3,076,767; 4,859,361; 5,110,499 and 5,009,808 relate to methods of producing ZnS:Cu,Cl electroluminescent phosphors; but do not address the problem of improving the brightness of the base electroluminescent phosphor. Higher brightness is an important requirement for electroluminescent phosphors, specifically where one needs higher light output with lower power consumption (i.e., low voltage applications).

DISCLOSURE OF INVENTION

It is, therefore, an object of this invention to obviate the disadvantages of the prior art.

It is yet another object of the invention to enhance electroluminescent phosphors.

Yet another object of the invention is the provision of a method for producing electroluminescent phosphors having a high brightness.

These objects are accomplished, in one aspect of the invention, by the provision of a method of increasing the brightness of an electroluminescent phosphor comprising the steps of: forming said phosphor as a base phosphor to have a given brightness; and annealing said base phosphor at a temperature and for a time sufficient to increase said given brightness of said base phosphor and form an annealed phosphor.

Brightness increases from about 8% to about 33% are available from this method.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Referring now to the method with greater particularity, a base ZnS:Cu,Cl electroluminescent phosphor was made as follows: 45.34 kg of chloride containing ZnS designated as S-10; 97.0 grams of $CuSO_4$ as a primary activator; 3.629 kg of sulfur and 227.0 grams of ZnO were blended together with flux materials comprising 3% $BaCl$; 3% $MgCl_2$; and 2% NaCl, by weight of the S-10 ZnS raw material. The blend was fired in covered crucibles in a furnace at 1205° C. for 5 hours, 15 minutes. In the case of small particle size electroluminescent phosphors (that is, phosphors having particle sizes in the range of 19–24 microns) firing will be at 1165° C. for 3 hours and 45 minutes. After this initial firing the fired material has a substantially hexagonal crystal structure. The fired cakes were removed from the furnace, cooled and washed with DI water to remove fluxes and dried. The dried material was then subjected to mechanical work damage in a milling unit for a sufficient time to induce transformation of the hexagonal ZnS to cubic ZnS. At this stage of the processing the material is substantially electroluminescently inactive and is referred to as first fired material (FFM).

The first fired material has added to it, by weight, about 3.9% $CuSO_4$ and 25.56% $ZnSO_4.7\ H_2O$ and is then re-blended and fired at about 700° C.–730° C. for about 2 hours and 15 minutes. The material at this stage is called second-step-fired material (SFM). The SFM material was washed twice with DI water; washed with acetic acid (0.777 liters of DI water+148.8 ml of glacial acetic acid per every 75 grams of SFM) to eliminate excess copper, ZnO and other flux additives and impurities. The SFM is then washed again with hot DI water until the wash solution is free of acid (i.e., a pH of ~6.0).

The now acid-free material was then washed with a KCN solution to eliminate unwanted copper compounds. This washing step lightens the body color of the material. The material is then again washed with hot DI water until free of any residual cyanide; filtered, dried at ~120° C. for 4 to 16 hours; and then sifted through a –325 mesh stainless steel sieve. The material is now an electroluminescent phosphor.

The material prepared as above was then split into 50-gram portions for annealing. A first sample, designated in the following Table I as 647-54-1 control, was tested for brightness without further treatment to provide an internal control and the remaining portions were treated to an annealing step at temperatures from 150° C. to 300° C. for from 15 to 60 minutes.

The annealed samples were taken out of the furnace, cooled, and sifted. The sifted material was then submitted of brightness measurements.

The emission of the samples was tested by means of the "oil cell method." This method consists of dispersing the electroluminescent phosphor in castor oil to form a suspension and then sandwiching the suspension between electrically conductive plates and applying voltages thereto.

The results are all shown in Table I, below.

TABLE I

| Sample | Anneal Temp. ° C. | Anneal Time, Minutes | Microtrac P. Size, μm | % Brightness @ 200 V | % Brightness @ 400 V | Color Value X | Color Value Y |
|---|---|---|---|---|---|---|---|
| 647-54-J1 Control | 0 | 0 | 24.7 | 100 | 100 | 0.180 | 0.436 |
| 647-54-2 | 200 | 15 | 24.5 | 108 | 102 | 0.181 | 0.440 |
| 647-54-3 | 200 | 30 | 24.5 | 121 | 109 | 0.194 | 0.470 |
| 647-54-4 | 200 | 45 | 23.7 | 119 | 111 | 0.196 | 0.469 |
| 647-54-5 | 200 | 60 | 24.9 | 124 | 108 | 0.196 | 0.474 |
| 647-54-6 | 150 | 30 | 24.4 | 101 | 98 | 0.181 | 0.440 |
| 647-54-7 | 200 | 30 | 24.4 | 115 | 110 | 0.193 | 0.464 |
| 647-54-8 | 250 | 30 | 24.1 | 133 | 118 | 0.202 | 0.485 |
| 647-54-9 | 300 | 30 | 24.9 | 129 | 116 | 0.213 | 0.518 |

As will be seen from Table I the annealing step incorporated herein provided substantial improvement in the brightness of the phosphors, this brightness increase ranging from 8% to 24% for those phosphors annealed in air at 200° C. for 30 to 60 minutes; while annealing at 250° C. for 30 minutes caused an improvement of about 33%. These increases are measured against the control, i.e., 647-54-1.

This annealing at relatively low temperatures thus provides a significant benefit. Also, as will be seen from the x-y coordinates, the color of the emitted light is shifted toward the green. Additionally, all of the annealed samples showed an increase in sulfate concentration at the surface when measured by Fourier Transform InfraRed (FTIR).

Thus, for this phosphor, optimum-annealing temperature is approximately 250° C. Optimum temperature may change slightly for other phosphors based, for example, on the particle size of the phosphor and the amount of phosphor taken in a container for annealing. Smaller amounts may need either reduced time or temperature whereas larger amounts may take longer or require a higher temperature for effective annealing to occur.

While there have been shown and described what are at present considered the preferred embodiments of the invention, it will be apparent to those skilled in the art that various changes and modifications can be made herein without departing from the scope of the invention as defined by the appended claims.

What is claimed is:

1. A method of increasing the brightness of a ZnS:Cu,Cl electroluminescent phosphor comprising the steps of: forming said phosphor as a base phosphor to have a given brightness; and annealing said base phosphor at a temperature and for a time sufficient to increase said given brightness of said base phosphor and form an annealed phosphor.

2. The method of claim 1 wherein said temperature is between about 150° C. to about 300° C.

3. The method of claim 1 wherein said time is about 15 to about 60 minutes.

4. The method of claim 2 wherein said time is about 15 to 60 minutes.

5. An annealed phosphor made by the method of claims 1, 2, 3, or 4 wherein said annealed phosphor has a higher concentration of sulfate on the surface thereof than said base phosphor.

* * * * *